United States Patent
Highlen et al.

[11] Patent Number: 5,141,259
[45] Date of Patent: Aug. 25, 1992

[54] FLEXIBLE CONNECTOR

[75] Inventors: John L. Highlen, Junction; William G. Thelen, Onondaga, both of Mich.

[73] Assignee: Aeroquip Corporation, Maumee, Ohio

[21] Appl. No.: 805,885

[22] Filed: Dec. 12, 1991

[51] Int. Cl.$^5$ .......................................... F16L 59/16
[52] U.S. Cl. ...................................... 285/49; 285/167; 285/223; 285/234; 285/263; 285/271; 285/915
[58] Field of Search ................... 285/49, 51, 135, 160, 285/167, 223, 263, 266, 271, 261, 234, 915

[56] References Cited

U.S. PATENT DOCUMENTS

| | | | |
|---|---|---|---|
| 2,504,634 | 4/1950 | Boschi | 285/49 |
| 3,038,743 | 6/1962 | Zaloumis | 285/51 |
| 3,519,289 | 7/1970 | Haffer | 284/49 |
| 3,734,546 | 5/1973 | Herbert et al. | 285/49 |
| 4,068,864 | 1/1978 | Herbert et al. | |
| 4,068,868 | 1/1978 | Ohrt | |
| 4,491,348 | 1/1985 | Thelen | |
| 4,570,979 | 2/1986 | Moore | |
| 4,593,941 | 6/1986 | Whightsil, Sr. | 285/223 X |
| 4,693,502 | 9/1987 | Oetiker | 285/915 X |
| 4,706,998 | 11/1987 | Peppel et al. | 285/223 X |
| 4,881,759 | 11/1984 | Kovitch et al. | |
| 4,928,998 | 5/1990 | Brandener | 285/49 |

FOREIGN PATENT DOCUMENTS

| | | | |
|---|---|---|---|
| 0298815 | 1/1989 | European Pat. Off. | 285/263 |
| 0305478 | 12/1929 | United Kingdom | 285/223 |
| 0641322 | 8/1950 | United Kingdom | 285/49 |

Primary Examiner—Randolph A. Reese
Assistant Examiner—Heather Chun
Attorney, Agent, or Firm—Emch, Schaffer, Schaub & Porcello Co.

[57] ABSTRACT

A flexible connector has a plurality of bearings housed in a single housing to attenuate vibration and noise. In one embodiment, the bearings have a spherical configuration with the center point of the spherical segment of one of the bearings at a different location from the center point of the spherical segment of the other bearing thereby providing efficient and compact bearings and a smaller envelope for such bearings.

12 Claims, 2 Drawing Sheets

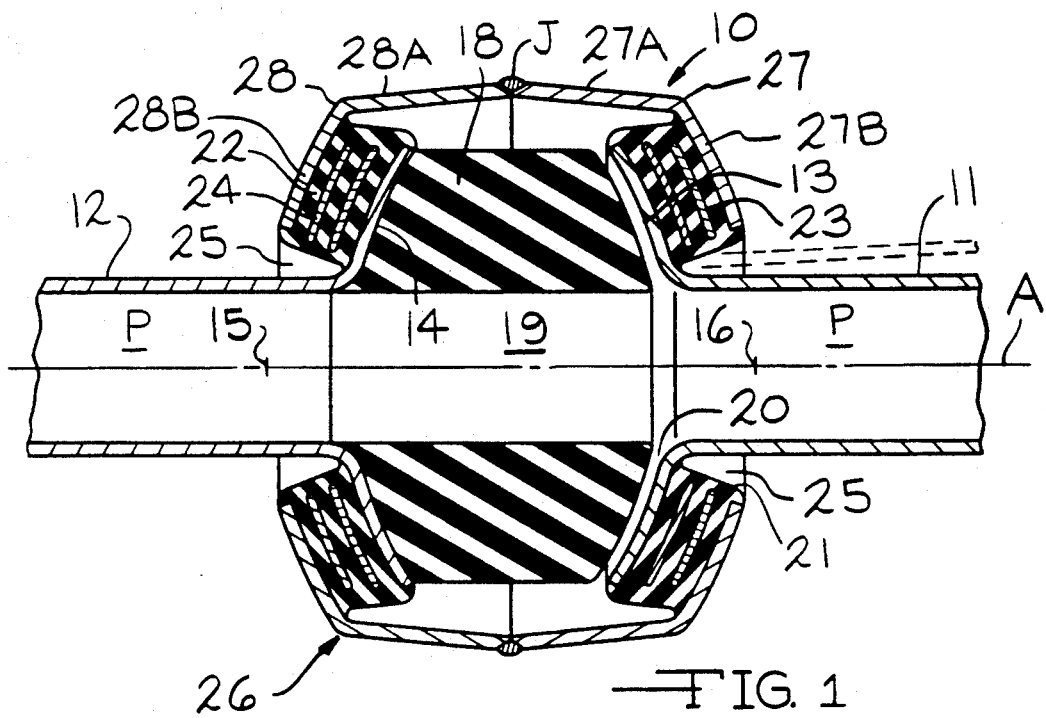

FLEXIBLE CONNECTOR

DESCRIPTION

Technical Field

The present invention relates to the field of connectors for fastening together lengths of tubing and, more particularly, relates to a multiple bearing flexible connector utilizing sets of individual bearings designed to accommodate a portion of the total motion of the tubing system and to attenuate a portion of the vibration present in the system when fluid is being conveyed therethrough under pressure. A number of similar, specifically configured, connector assemblies may be distributed throughout a fluid transport system with each assembly designed to match the motion and damping requirements of its portion of the transport system.

The following patents have been considered in the preparation of this application: U.S. Pat. Nos. 4,068,864; 4,491,348; 4,570,979; and 4,881,759.

In general the above patents reveal the need for a flexible connector for joining together rigid lengths of tubing in a fluid transport system, which connectors can accommodate the motion and attenuate the sound and vibration to which the system is subjected. While the above patents permit some degree of angular motion between connected lengths of large pipe sections, the connectors and couplings disclosed have a number of disadvantages including high cost of manufacture.

DISCLOSURE OF INVENTION

The present invention is directed to a flexible connector utilizing multiple bearings designed to accommodate a specific portion of the total motion and to attenuate a specific portion of the vibrational movement present in the fluid transport system. Each connector assembly includes a bumper to limit inward axial movement of the components. The connector of the present invention utilizes a plurality of bearings housed in a single connector to distribute mechanical motion. In one embodiment, such bearings must have a spherical configuration. Two sets of spherical bearings may be used with their concavities facing each other; however, the center point of the spherical segment of one of the bearings is not necessarily at the same location as the center point of the spherical segment of the other bearing. The offsetting of such center points permit the use of more efficient and compact bearings, a smaller envelope for such bearings and a more economical connector. Additionally, smaller elastomeric pads may be used in the bearings of the present connector than is possible with other types of connectors. The smaller pads have lower stiffness and have the ability to reduce noise more effectively at lower stress levels thereby providing more reliable service with less wear and longer connector life. Under another embodiment, the two sets of bearings may have different configurations from one another.

BRIEF DESCRIPTION OF THE DRAWINGS

FIG. 1 is a sectional view taken through the longitudinal axis of the flexible connector of the present invention.

FIG. 2 is a sectional view similar to FIG. 1 showing another embodiment of the present invention.

BEST MODE OF CARRYING OUT INVENTION

Figure 3:
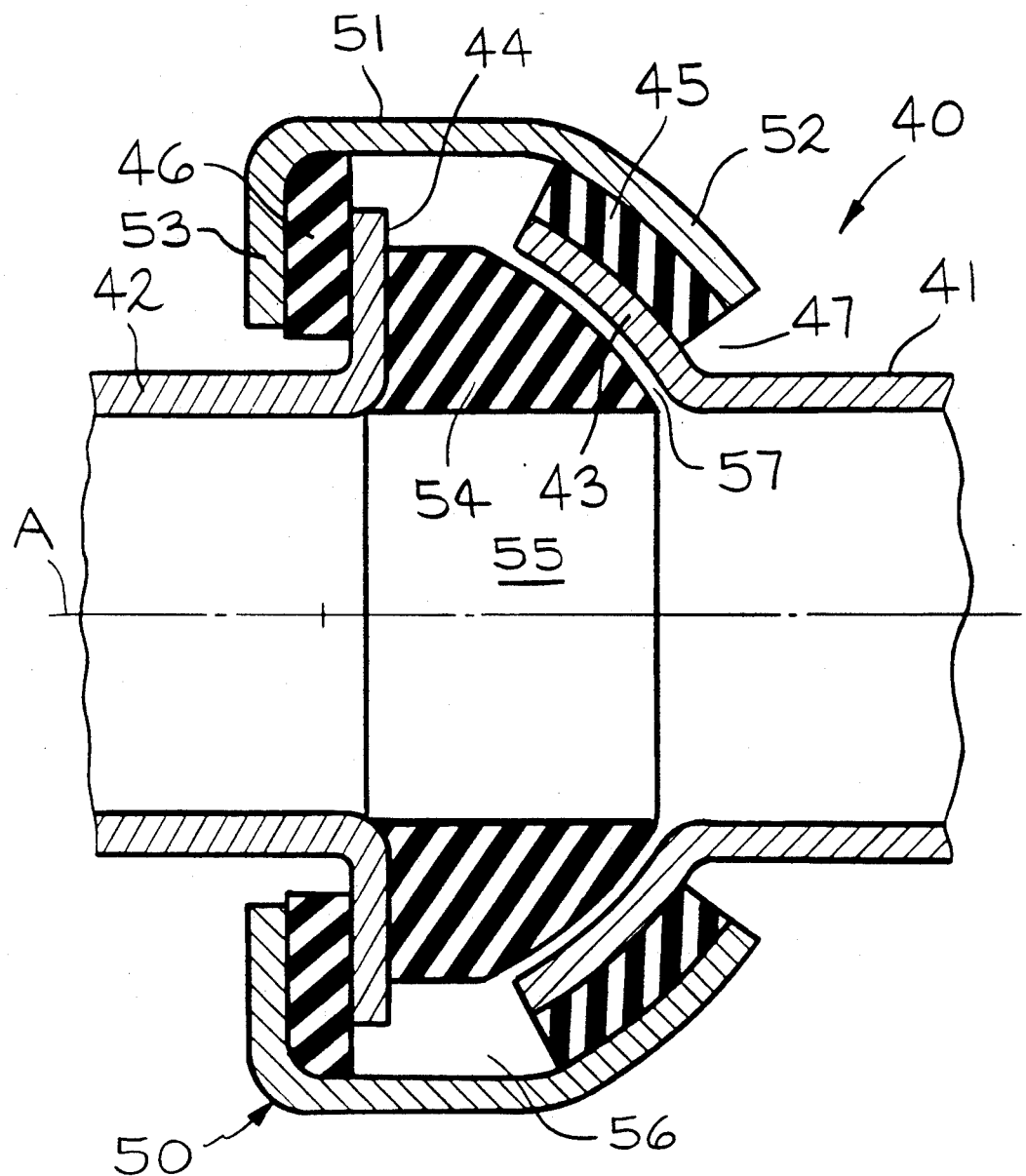
FIG. 3 is a sectional view of a further embodiment of the present invention.

Referring now to FIG. 1, there is shown one form of connector 10 of the present invention for fastening together the end of a first length of tubing 11 and the end of a second length of tubing 12. As shown, the first and second lengths of tubing extend along an axis A and each length of tubing defines a passageway P for the conveyance of fluid, either liquid or gaseous. It is contemplated that the flexible connector could be used in automotive applications for conveying one of a wide variety of fluids conveyed therein. This includes automotive air-conditioning systems for conveying a refrigerant such as Freon ®; however, it will be readily apparent that many types of fluids, gaseous or liquid, could flow satisfactorily through the flexible connector and the transport system of which such connector forms a part.

The first length of tubing 11 terminates in an outwardly flaring flange 13 shaped to have a spherical configuration defining a segment of a sphere, the center of which lies on the axis A at point 15. Similarly, the second length of tubing 12 terminates in an outwardly flaring flange 14 which also has a spherical configuration defining a segment of a sphere the center of which lies on the axis A at point 16. As can be seen in FIG. 1, the concave portions of the flanges 13 and 14 face one another.

Positioned between the flanges 13 and 14 is an annular bumper 18 having a passageway 19 coaxial with the passageway P of each of the first and second lengths of tubing 11 and 12. The bumper 18 is preferably bonded to one of the flanges 13 or 14 but may be bonded to both of such flanges. As shown in FIG. 1, the bumper 18 is bonded to the flange 14. The bumper 18 is preferably spaced from the inner surface of the flange 13 leaving a gap 20.

Bonded to the outside surface of each of the flanges 13 and 14 are bearings 21 and 22, respectively, formed of a suitable elastomeric material which may be a rubber-like material such as SBR synthetic rubber, natural rubber, Neoprene W or a urethane material. A suitable elastomeric material is one sold under the name Tornac ® manufactured by Polysar, Sarnia, Ontario, Canada. An adhesive suitable for adhering the bearings 21 and 22 to their respective adjacent members is one marketed under the name ChemLok ® 205/220 by Lord Corporation, Erie, Pa. The bearings 13 and 14 may have spherical metal rings 23 and 24, respectively, to provide additional stability and stiffening; however, if desired, the metallic spherical rings 23 and 24 may be omitted for lower pressure or lower flexure applications.

Encircling the bumper 18 and the bearings 21 and 22 adhered to their respective flanges 13 and 14, is a housing 26. The housing 26 is formed in two sections 27 and 28 which are joined together as by welding or other suitable fastening means at a joint J. As can been seen, the section 27 includes a central portion 27A which is generally parallel to the axis A and an inwardly angled section 27B having a spherical configuration which is adhered to the bearing 21 and which is generated from center point 15. Similarly, the housing section 28 has a central section 28A and an inwardly angled section 28B having a spherical configuration which is adhered to the bearing 22 and which is generated from center point 16.

If desired, the housing 26 could be formed in one piece. In this case, one of the inwardly angled sections 27B or 28B would be deformed in place and a subsequent curing step would be performed to adhere the adjacent bearing 21 or 22 thereto.

Pressurized fluid flowing through the passageways P of the first and second lengths of tubing 11 and 12 and the adjoining passageway 19 of the bumper 18 along with mechanical components within the system subjects the connector 10 of the present invention to vibrations and noises which are attenuated by the bearings 21 and 22. The presence of the bearings 21 and 22 on opposite sides of the bumper 18 permits a greater degree of angular movement to occur in response to the movement of the transport system than would be possible with only a single set of bearings for the connector. Thus, the length of tubing 11 may be moved from the position shown in FIG. 1 co-axial with the axis A to an angular position such as that shown in dashed lines in FIG. 1. As can be seen, the bearings 21 and 22 are spaced from the cylindrical wall of the main portion of the respective first and second lengths of tubing 11 and 12 leaving a gap 25 between each of such bearings 21 and 22 and the length of tubing 11 or 12 adjacent thereto. The presence of the gap 25 permits angular displacement of the first length of tubing 11 relative to the second length of tubing 12 without interference. Additionally, the spherical shape of the bearings 21 and 22 causes the stresses developed by such movement to be in shear within the elastomeric material of the bearing thus allowing for such movement or flexure between the joined lengths of tubing 11 and 12 while minimizing detrimental tensile stresses within the elastomer. The utilization of the bumper 18 bonded at only a single one of the two spherical flanges permits relative movement between the bumper 18 and the unbonded spherical flange 13 in response to angular movement the two lengths of tubing 11 and 12 without causing such bumper 18 to flex. The gap 20 permits such movement without the bumper 18 sliding against the inner surface of the flange 13. The gap 20 also permits fluid to flow into the chamber defined by the outer surface of the bumper 18 and the inner surface of the housing 26 or 30 and avoids the build-up of pressure in such chamber while allowing some movement angularly before contact between the bumper 18 and the flange 13.

Referring now to FIG. 2, there is shown a modified connector 30 for joining together the first and second lengths of tubing 11 and 12, respectively. The significant difference between this embodiment and the embodiment of FIG. 1 resides in the housing member. Accordingly, the other members such as the flanges 13 and 14 of the first and second lengths of tubing 11 and 12, respectively, the bumper 18, and the bearings 21 and 22 will be designated by the same numerals as in the embodiment of FIG. 1.

Joining the two lengths of tubing 11 and 12 together is a sectional housing 31 consisting of a first section 33 having a generally cylindrical portion 33A encircling the bumper 18 in spaced relationship substantially parallel to the axis A and an inwardly angled portion 33B having a spherically shaped inner surface which is adhered to the bearing 21. The spherical segment of such inner surface is generated from center point 15. A radial flange 33C extends inwardly from the cylindrical portion 33A.

The second section 34 of the sectional housing 31 includes inner and outer cylindrical portions 34A and 34B which encircle the bumper 18 in spaced relationship. A flange 34C extends radially outwardly from a first cylindrical portion 34A. The second cylindrical section 34B is larger than the first cylindrical portion 34A and is joined thereto at a shoulder 35. Angled inwardly from the second cylindrical portion 34B is a portion 34D having a spherically-shaped inner surface which is adhered to the bearing 22. The spherical segment of such inner surface is generated from center point 16.

If desired, the second cylindrical portion 34B may be the same diameter as the first cylindrical portion 34A in which case there will not be a shoulder 35. Any axial movement of the first length of tubing 11 toward the second length of tubing 12 will be limited by the bumper 18.

The cylindrical portion 33A and flange 33C of the first section 33 cooperate with the first cylindrical portion 34A and flange 34C of the second section 34 to define an annular chamber in which is positioned a pair of O-ring seals 37 which are spaced apart and which are sealingly engaged to the inner surface of the cylindrical portion 33A of the first section 33 and to the outer surface of the first cylindrical portion 34A of the second section 34. Other seals having different configurations may be used in lieu of O-ring seals. A spacer 38 is positioned between the O-ring seals 37 and a pair of circumferential bearings 39 are positioned one on opposite sides of the O-ring seals 37. If desired a single O-ring seal and a pair of bearings may be used.

The O-ring seals 37 are preferably formed of a resilient, chemically stable, polymeric material such as a flourosilicone polymer known as Neoprene W. The bearings 39 are preferably formed of nylon but may be formed of other materials possessing chemical resistance to the fluid being conveyed and sufficient strength to support the members in sealed position. The spacer 38 may be formed of the same material as the bearings.

During the assembly step, the flange 33C is not present but rather the cylindrical section 33A will extend to the position indicated in dashed lines by the letter X in FIG. 2 and then will be deformed to form the flange 33C connecting the sections together.

As will be appreciated, the modified connector of the FIG. 2 embodiment permits rotational movement of the first length of tubing 11 relative to the second length of tubing 12 by virtue of relative movement between the bearings 39 and the adjacent surfaces of (1) the cylindrical portion 33A of the first section 33 and (2) the first cylindrical portion 34A of the second section 34. The swivel or rotational feature provided by the bearings 39 permits ease of installation in an automobile or other system.

Referring now the FIG. 3, there is provided a third embodiment of the connector of the present invention which is specifically designed for less severe angular requirements than those of the first and second embodiments. The embodiment of FIG. 3 has fewer components and is less expensive than the previous embodiments. There is provided a connector generally designated by the numeral 40 for joining together a first length of tubing 41 and a second length of tubing 42. The first length of tubing 41 has an outwardly flaring flange 43 having a curved shape when viewed in cross section taken along the axis A. Although the flange 43 could have a spherical configuration, it may have a wide variety of other configurations. The second length of tubing 42 has a flange 44 extending radially outwardly in a plane perpendicular to the axis A (FIG. 3) or at an angle, acute in either direction, to the axis A.

A pad 45 formed of elastomeric material is bonded to the outer surface of the outwardly flaring flange 43. A lateral pad 46 formed of elastomeric material encircles the second length of tubing 42 and is bonded to the rear face of the flange 44 (i.e., the face opposite the one facing the first length of tubing 41). A collar 50 encircles the respective flanges 43 and 44. The collar 50 includes a cylindrical portion 51 and inwardly curving portion 52 and a radially inwardly extending flange 53. The inwardly curving portion 52 is bonded to the pad 45 and the inwardly extending flange 53 is bonded to the pad 46.

As with the embodiments of FIGS. 1 and 2, the collar 50 may be deformed in place to form the flange 53 or inwardly curving portion 52 or it may be formed in two pieces which are mechanically joined together.

As can be seen, the pad 45 is spaced from the side wall of the cylindrical portion of the first length of tubing 41, thus, leaving a gap 47 between the end of the pad 45 and the cylindrical portion of the first length of tubing 41. As a result, the first length of tubing 41 is permitted to move angularly in response to motion of the transport system without interference from the pad 45. Thus, angular movement of the first length of tubing 41 relative to the second length of tubing 42 is permitted by the elastomeric pad 45 adhered to the flange 43 and the inwardly curving portion 52 of the collar 50. As will be appreciated, such angular displacement of the first length of tubing 41 relative to the second length of tubing 42 will result in compressive forces being applied to one portion of the lateral pad 46 bonded between the radial flange 44 of the second length of tubing and the flange 53 of the collar 50 and tensile forces applied to the opposite side of such pad 46. Shear forces are applied to the pad 45.

A bumper 54 having an annular configuration with a passageway 55 coaxial with the axis A is adhered to the front face of the flange 44. The bumper 54 is spaced from the inner face of the flange 43 thus leaving a gap 57. The gap 57 permits fluid flowing through the joined lengths of tubing 41 and 42 to reach the annular chamber 56 between the collar 50 and the bumper 54 without becoming entrapped therein and also permits angular movement between the lengths of tubing 41 and 42 without causing the bumper 54 to slide against the inner surface of the flange 43. The gap could be adjacent the flange 44 or even omitted if large angular motions are not required, for example angular motions of less than 2°.

The connector of the present invention is one which is particularly well suited for automotive applications. The connector is compact, economical and permits a specific embodiment or configuration of connector to be distributed throughout the fluid transport system with each such connector designed to match the motion and damping requirements of its particular portion of the total system. A bumper is provided to limit the inward axial motion which could otherwise subject the bearings to a detrimental tensile load.

Many modifications will become readily apparent to those skilled in the art. Accordingly, the scope of the present invention should be determined only by the scope of the appended claims.

We claim:

1. A flexible connector for joining together an end of a first length of tubing extending along a first axis with an end of a second length of tubing extending along a second axis comprising:

(a) a first tubular portion extending from said first length, an integral first end portion extending from said first tubular portion outwardly away from said first axis, said first end portion having a concave surface in the direction facing said second length and a convex surface;
    (b) a second tubular portion extending from said second length, an integral second end portion extending from said second tubular portion outwardly away from said second axis, said second end portion having a first surface facing said concave surface and a second surface;
    (c) elastomeric bumper means adhered to one member of the group consisting of said first end portion and said second end portion and positioned adjacent the other member of said group;
    (d) first elastomeric pad means adhered to said first end portion convex surface;
    (e) second elastomeric pad means adhered to said second end portion second surface; and
    (f) a collar encircling said first end portion and said second end portion, said collar having a first flange extending inwardly toward said first axis adhered to said first elastomeric pad means and a second flange extending inwardly toward said second axis adhered to said second elastomeric pad means.

2. A flexible connector according to claim 1 wherein the concave surface of said first end portion is a segment of a sphere having a first center point and wherein said second end portion first surface is a segment of a sphere having center point spaced from said first center point.

3. A flexible connector according to claim 2 wherein said collar includes first and second sections cooperating to define an annular chamber and further including (i) circumferential gasket means in said annular chamber forming a seal between said first and second sections, (ii) circumferential bearing means in said chamber permitting rotational movement between said first and second sections and (iii) means for securing said first and second sections together.

4. A flexible connector according to claim 3 wherein said means for securing said collar first and second sections together includes a cylindrical wall and an inwardly directed flange on said first section and a cylindrical wall and outwardly directed flange on said second section cooperating to define said chamber and wherein said bearing means includes a first bearing engaging said inwardly directed flange and a second bearing engaging said outwardly directed flange.

5. A flexible connector according to claim 1 wherein said bumper means is spaced from the other member of said group.

6. A flexible connector according to claim 1 wherein said second end portion comprises a radially outwardly extending flange and said second surface defines a plane perpendicular to said second axis.

7. A flexible connector for joining together an end of a first length of tubing extending along a first axis with an end of a second length of tubing extending along a second axis comprising:

(a) a first tubular portion extending from said first length, an integral first end portion extending from said first tubular portion outwardly away from said first axis, said first end portion defining a segment of a sphere having a concave surface in the direction facing said second length and a convex surface;

(b) a second tubular portion extending from said second length, an integral second end portion extending from said second tubular portion outwardly away from said second axis, said second end defining a segment of sphere portion having a concave surface facing said first end portion concave surface and a convex surface;

(c) elastomeric bumper means adhered to one member of the group consisting of said first end portion concave surface and said second end portion concave surface and positioned adjacent the other member of said group;

(d) first elastomeric pad means adhered to said first end portion convex surface;

(e) second elastomeric pad means adhered to said second end portion convex surface; and (f) a collar encircling said first end portion and said second end portion, said collar having a first flange extending inwardly toward said first axis adhered to said first elastomeric pad means and a second flange extending inwardly toward said second axis adhered to said second elastomeric pad means.

8. A flexible connector according to claim 7 wherein said first axis is co-axial with said second axis when said connector is not subjected to pressures or stresses and wherein said first end portion concave surface is developed from a first center point lying on said first axis and said second end portion concave surface is developed from a second center point lying on said second axis, said second center point being spaced from said first center point, the distance from said second center point to said first elastomeric pad means being less than the distance from said first center point to said first elastomeric pad means.

9. A flexible connector according to claim 7 wherein said collar includes first and second sections cooperating to define an annular chamber and further including (i) circumferential gasket means in said annular chamber forming a seal between said first and second section, (ii) circumferential bearing means in said chamber permitting rotational movement between said first and second sections and (iii) means for securing said first and second sections together.

10. A flexible connector according to claim 9 wherein said means for securing said collar includes first and second sections together includes a cylindrical wall and an inwardly directed flange on said first section and a cylindrical wall and outwardly directed flange on said second section cooperating to define said chamber and wherein said bearing means includes a first bearing engaging said inwardly directed flange and a second bearing engaging said outwardly directed flange.

11. A flexible connector according to claim 7 wherein said bumper means is spaced from the other member of said group.

12. A flexible connector for joining together an end of a first length of tubing extending along a first axis with an end of a second length of tubing extending along a second axis comprising:

(a) a first tubular portion extending from said first length, an integral first end portion extending from said first tubular portion outwardly away from said first axis, said first end portion having a concave surface in the direction facing said second length and a convex surface;

(b) a second tubular portion extending from said second length, an integral second end portion extending from said second tubular portion outwardly away from said second axis, said second end portion having a first planar surface perpendicular to said second axis facing said concave surface and a second surface;

(c) elastomeric bumper means adhered to one member of the group consisting of said first end portion concave surface and said second end portion first planar surface and positioned adjacent the other member of said group;

(d) first elastomeric pad means adhered to said first end portion convex surface;

(e) second elastomeric pad means adhered to said second end portion second surface; and (f) a collar encircling said first end portion and said second end portion, said collar having a first flange extending inwardly toward said first axis adhered to said first elastomeric pad means and a second flange extending inwardly toward said second axis adhered to said second elastomeric pad means.

* * * * *